United States Patent
Ogawa et al.

(10) Patent No.: US 6,690,852 B2
(45) Date of Patent: Feb. 10, 2004

(54) OPTICAL MULTIPLEXER/DEMULTIPLEXER

(75) Inventors: Hirokuni Ogawa, Sakura (JP); Katsutoshi Kohmoto, Sakura (JP); Kouji Ohura, Sakura (JP); Kenichiro Asano, Sakura (JP); Hideyuki Hosoya, Sakura (JP)

(73) Assignee: Fujikura Ltd., Tokyo (JP)

( * ) Notice: Subject to any disclaimer, the term of this patent is extended or adjusted under 35 U.S.C. 154(b) by 220 days.

(21) Appl. No.: 09/885,801

(22) Filed: Jun. 20, 2001

(65) Prior Publication Data

US 2002/0021863 A1 Feb. 21, 2002

(30) Foreign Application Priority Data

Jun. 22, 2000 (JP) .................................... P2000-188217

(51) Int. Cl.⁷ ................................................ G02B 6/28
(52) U.S. Cl. ........................... 385/24; 385/11; 385/129; 385/141
(58) Field of Search .................... 385/11, 24, 27–30, 385/32, 37, 46; 359/122, 124, 127, 130

(56) References Cited

U.S. PATENT DOCUMENTS

| 4,786,131 A | 11/1988 | Mahapatra et al. |
| 5,108,201 A | 4/1992 | Matsuura et al. |
| 6,400,860 B1 * | 6/2002 | Chandrasekhar et al. ..... 385/24 |

OTHER PUBLICATIONS

Hiroshi Takahashi et al., "Transmission Characteristics of Arrayed Waveguide N×N Wavelength Multiplexer" Journal of Lightwave Technology, vol. 13, No. 3 (Mar. 1995), pp. 447–455.

Thoru Matsuura e al., "Polyimides Derived from 2,2'—Bis(trifluoromethyl)–4,4'–diaminobiphenil. 4. Optical Properties of Fluorinated Polyimides for Optoelectronic Componets" Macromolecules, 1994, 27, pp. 6665–6670.

C. Dragone, "An N×N Optical Multiplexer Using a Planar Arrangement of Two Star Couplers" IEEE Photonics Technology Letters Vol, 3 No.9, (Sep. 1991), pp. 812–815.

Junya Kobayashi et al., "Tunable and Polarization–Insensitive Arrayed–Waveguide Grating Multiplexer Fabricated from Fluorinated Polyimides"IECE TRANS. ELECTRON., vol.E 81–C, No. 7 Jul. 1998, pp. 1020–1026.

* cited by examiner

Primary Examiner—Frank G. Font
Assistant Examiner—Michael P. Mooney
(74) Attorney, Agent, or Firm—Bell, Boyd & Lloyd LLC

(57) ABSTRACT

In the manufacture of an arrayed waveguide grating type optical multiplexer/demultiplexer, respective slab waveguides are provided at input sides and output sides of a waveguide array in a cladding layer formed upon a substrate, which includes plural waveguides whose lengths differ and which are arranged in parallel; and an input waveguide is provided at the input side of the input side slab waveguide, while plural output waveguides are provided at the output side of the output side slab waveguide. The waveguides are made from a material for which the difference between the effective refractive indices for the two polarizations is large, and thereby, when multiplexed light which consists of plural lights of different wavelengths is inputted to said input waveguide, lights which have been separated by wavelength and by polarization are outputted from each of said output waveguides. As a result, it is possible to make a polarization/wavelength multiplex transmission circuit using fewer elements.

14 Claims, 15 Drawing Sheets

OPTICAL MULTIPLEXER/DEMULTIPLEXER

BACKGROUND OF THE INVENTION

1. Field of the Invention

The present invention relates to an optical arrayed waveguide grating type multiplexer/demultiplexer which is employed in the field of optical communication. The present specification is based upon Japanese Patent Application S.N. 2000-188217, and hereby incorporates the subject matter of that application by reference.

2. Background Art

In an optical communication system, in order to transmit a large quantity of information, a wavelength multiplex transmission method is proposed in which light at different wavelengths is multiplexed and transmitted. Further, since light is made up from two polarizations which are perpendicular, a polarization/wavelength multiplex transmission method is also proposed in which, when multiplexing, transmitting and outputting light at different wavelengths, the light is separated for each wavelength and also for each polarization and is outputted. It should be noted that one of the polarizations will hereinafter be referred to as the "TE polarization" and the other as the "TM polarization".

FIG. 14 is a block diagram which shows an example of a prior art polarization/wavelength multiplex transmission circuit. With this circuit, when multiplexed light of four wavelengths $\lambda 1$, $\lambda 2$, $\lambda 3$, and $\lambda 4$ is inputted to an input side optical fiber 1 which is positioned at the left side of the figure, this light is inputted to an input port 2a of a polarization beam splitter 2, is divided into polarizations in this polarization beam splitter 2, and is outputted from output ports 2b and 2c as, respectively, a TE polarization and a TM polarization of the four wavelengths.

Next, the multiplexed light of the TE polarization is inputted via an optical fiber 1 which is connected to the output port 2b to an input port 3a of an optical multiplexer/demultiplexer 3, and is separated into its various wavelengths by this optical multiplexer/demultiplexer 3, so that four TE polarizations of the four wavelengths $\lambda 1$, $\lambda 2$, $\lambda 3$, and $\lambda 4$ are output to optical fibers 1 which are connected to its output ports 3b, 3c, 3d and 3e, respectively. On the other hand, the multiplexed light of the TM polarization is also, in the same manner, inputted via an optical fiber 1 which is connected to the output port 2c to an input port 4a of an optical multiplexer/demultiplexer 4, and is separated into its various wavelengths by this optical multiplexer/demultiplexer 4, so that four TM polarizations of the four wavelengths $\lambda 1$, $\lambda 2$, $\lambda 3$, and $\lambda 4$ are output to optical fibers 1 which are connected to its output ports 4b, 4c, 4d and 4e, respectively. As a result, it is possible to separate the multiplexed light of the four wavelengths by wavelength and by polarization, into a total of eight parts.

In this manner, with a prior art polarization/wavelength multiplex transmission circuit, they are required both a single polarization beam splitter for separation into polarizations, and two optical multiplexer demultiplexers for separation into different wavelengths. However, since the efficiency of space utilization is deteriorated and the loss is increased when the number of devices which make up the circuit increases, there has been a demand for a technique for building a polarization/wavelength multiplex transmission circuit with a smaller number of devices. In concrete terms, a device would be desirable which could perform separation of polarizations and separation of wavelengths simultaneously.

On the other hand an arrayed waveguide grating type optical multiplexer/demultiplexer is often used as an optical multiplexer/demultiplexer, because its wavelength separation performance is high.

FIG. 15 shows an example of an arrayed waveguide grating type optical multiplexer/demultiplexer: in this figure, an waveguide array 8 is formed by providing a plate shaped cladding layer 6 made from silica based glass upon a silicon substrate 5, and by arranging waveguides 7, 7 . . . made from silica based glass on this cladding layer generally in parallel and in a letter-U configuration. It should be understood that the lengths of these waveguides 7, 7 . . . which make up the waveguide array 8 differ from one another in steps of $\Delta L$.

At both the ends of this waveguide array 8, i.e. its input side and its output side, respective slab waveguides 9 and 10 are provided. To the input side of this slab waveguide 9 there are provided plural input waveguides 11, 11 . . . in parallel. On the opposite side, to the output side of the slab waveguide 10 there are provided plural input waveguides 12, 12 . . . in parallel. Each of the waveguides 7 through 12, in order for it to propagate light, is made from a material having a refractive index which is higher than that of the cladding layer 6 which is provided around each of the waveguides 7 through 12.

And when multiplexed light consisting of light of plural wavelengths is inputted to one of the input waveguides 11, this multiplexed light is distributed via the slab waveguide 9 between the plurality of waveguides 7, 7 . . . which make up the waveguide array 8 in roughly equal proportions, and is propagated through these waveguides 7, 7 . . . with optical path length differences occurring by $\Delta L$. And wavelengths are selected by these lights interfering in the slab waveguide 10 on the output side, and these lights of the wavelengths are outputted from the output waveguides 12, 12 . . . respectively.

Moreover, such an arrayed waveguide grating type optical multiplexer/demultiplexer is an optical product which uses a planar waveguide, and just as it is the refractive index differs according to polarization (there is an anisotropy in the refractive index), a polarization dependency exists. Since a planar waveguide, as described above, generally comprises a cladding layer made from silica based glass and a waveguide upon a silicon substrate, during manufacture, due to the difference in coefficient of thermal expansion between silicon and silica based glass, a slight residual stress is engendered in the waveguide in the process of cooling of the cladding layer and the waveguide down from a high temperature to a low temperature, and this residual stress causes a polarization dependency.

Accordingly, just as it is, even at the same wavelength, the focal positions at the output end of the slab waveguide 10 are different for the different polarizations.

Since this characteristic is an inconvenience when separating the wavelengths, in the prior art, as shown in FIG. 15, a half wavelength plate 13 is inserted in the center of the waveguide array 8, and thereby characteristics which do not depend upon polarization are obtained.

Or the method is employed of setting the position of the input end of each of the respective output waveguides 12, 12 . . . of the slab waveguide 10 of the output side at the central point between the focusing positions of the two polarizations which make up the light of the wavelength which is distributed to this output waveguide 12, so as to output these two polarizations from a single output waveguide 12.

On the other hand, a proposal has been made to use an arrayed waveguide grating type optical multiplexer/ demultiplexer as a polarization beam splitter by taking advantage of this polarization dependence.

However, no proposal has ever yet been made for an arrayed waveguide grating type optical multiplexer/demultiplexer which simultaneously performs wavelength separation and polarization separation.

SUMMARY OF THE INVENTION

The present invention has as its subject the provision of an art which is capable of constructing a polarization/wavelength multiplex transmission circuit from a small number of comprised devices. In concrete terms, its objective is to provide an optical multiplexer/demultiplexer which is capable of simultaneously performing separation by wavelength and separation by polarization. Furthermore, another of its objectives is to provide an optical multiplexer/demultiplexer of the arrayed waveguide grating type which is capable of simultaneously performing separation by wavelength and separation by polarization.

In order to fulfil this objective, the present invention proposes an arrayed waveguide grating type optical multiplexer/demultiplexer in which a waveguide, comprising a waveguide array in which plural waveguides of different lengths are arranged in parallel, a first slab waveguide and a second slab waveguide which are provided at opposite ends of said waveguide array, an input/output waveguide which is provided on the outer side of said first slab waveguide, and plural input/output waveguides which are provided on the outer side of said second slab waveguide, is provided in a cladding layer, characterized in that, when multiplexed light consisting of lights of plural different wavelengths is inputted into said input/output waveguide which is provided at the outer side of said first slab waveguide, the lights which have been separated by wavelength and by polarization are outputted from said plurality of input/output waveguides which are provided at the outer side of said second slab waveguide.

The following type of benefits are obtained by the present invention.

It is possible to provide an optical multiplexer/demultiplexer which can perform separation and combination of lights of different wavelengths and polarizations simultaneously.

Because of this, instead of using a polarization beam splitter and two optical multiplexer/demultiplexers, it is possible to build a polarization/wavelength multiplex transmission circuit with a single optical multiplexer/demultiplexer, so that it is possible to envisage economy of space and reduction of losses.

DESCRIPTION OF THE PREFERRED EMBODIMENT

Figure 1:
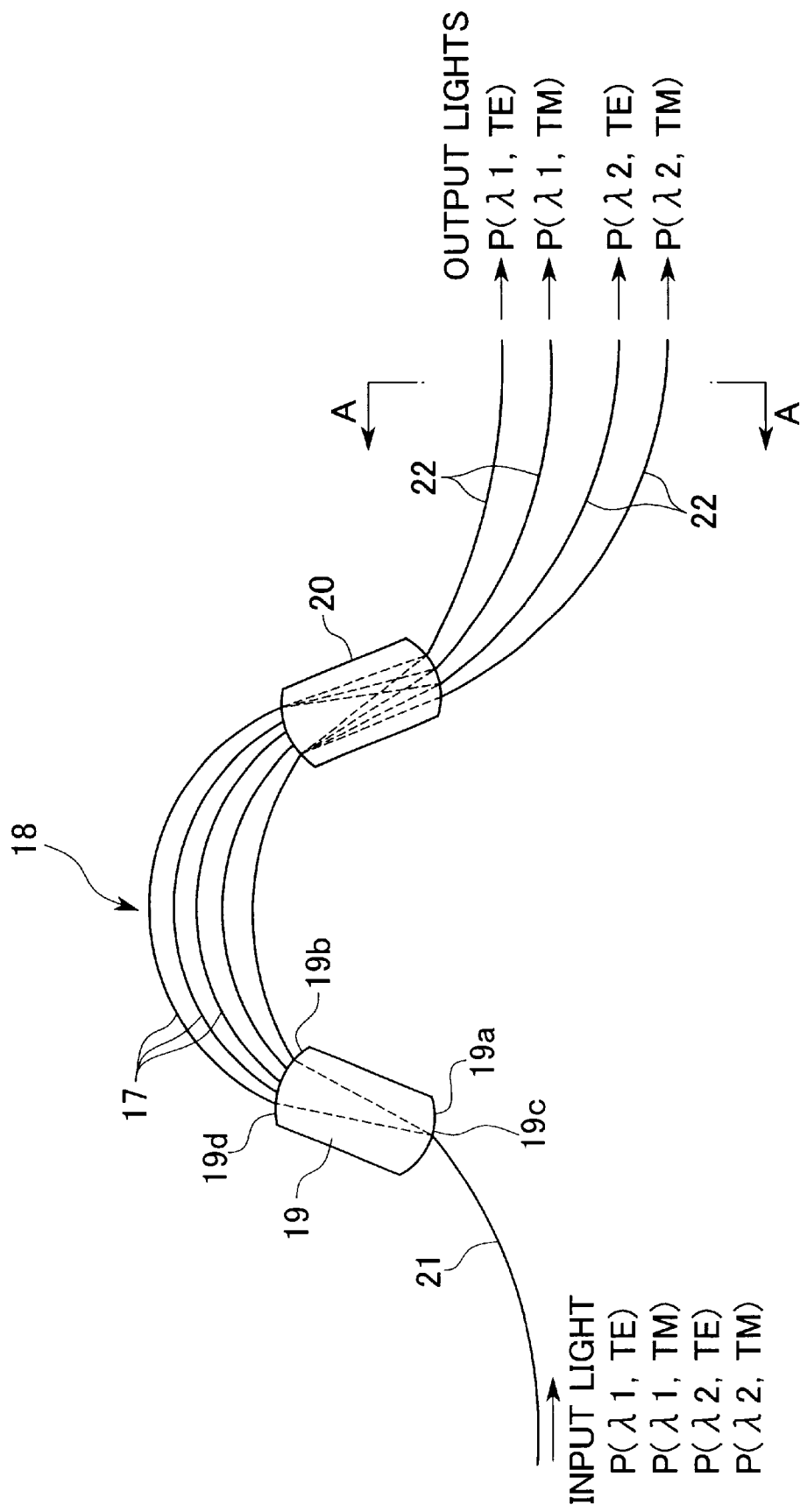
FIG. 1 is a plan view showing an example of a structure of an arrayed waveguide grating type optical multiplexer/demultiplexer according to the present invention.
Figure 2:
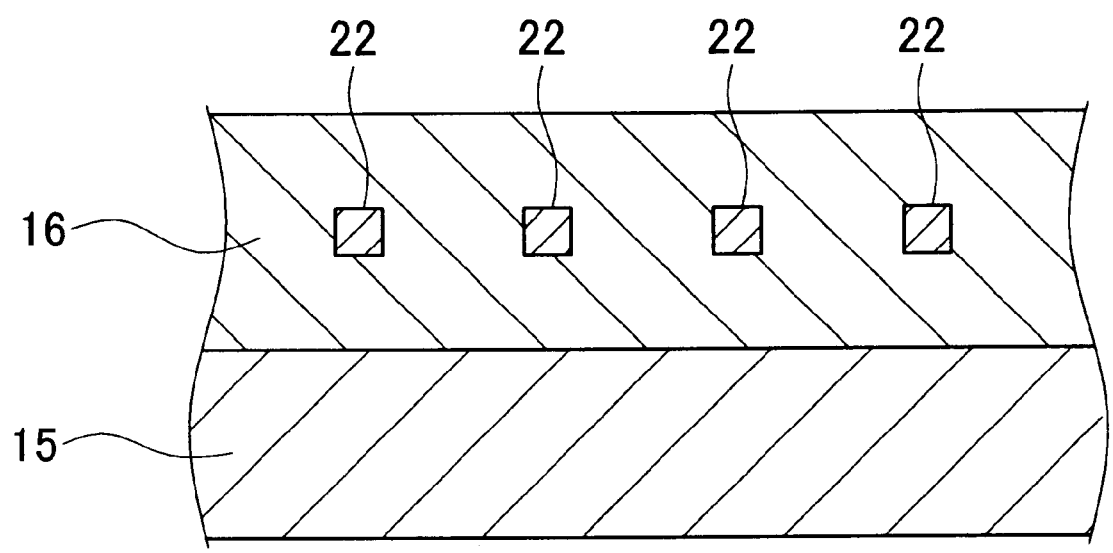
FIG. 2 is a sectional view thereof taken in a plane shown by the arrows A—A in FIG. 1.

FIG. 1 is a plan view showing an example of a structure of an arrayed waveguide grating type optical multiplexer/demultiplexer according to the present invention. It should be understood that in FIG. 1, for the convenience of explanation, a substrate and a cladding layer which will be described hereinafter are not shown. FIG. 2 is a sectional view of this device taken in a plane shown by the arrows A—A in FIG. 1.

This optical multiplexer/demultiplexer is one in which a waveguide is formed within a plate shaped cladding layer 16 which is formed upon a substrate 15 such as for example a silicon substrate or the like.

The structure of the waveguide is as follows.

First, as shown in FIG. 1, in its center, plural waveguides 17, 17 . . . are arranged generally in parallel and in a letter-U configuration, so as to constitute an waveguide array 18. The lengths of adjacent ones of these waveguides 17, 17 . . . differ from one another in steps of ΔL. The number of waveguides 17, 17 . . . is set according to requirements.

And a first slab waveguide 19 and a second slab waveguide 20 are respectively provided at the input side and the output side (when separating light) of this waveguide array 18.

It should be understood that these slab waveguides 18 and 19 respectively serve as the input side and the output side of this device during separation of light (demultiplexing). On the other hand, during combination of light (multiplexing), the input side and the output side of this waveguide array 18 are reversed. In the following explanation, for the sake of convenience, the operation during separation of light (demultiplexing) will be described.

The first slab waveguide 19 on the input side is nearly rectangular. Moreover, the two opposite short sides 19c and 19d which constitute the input end 19a and the output end 19b of this first slab waveguide 19 are formed as convex arcs which project in the outward direction. The second slab waveguide 20 on the output side is shaped the same as this first slab waveguide 19.

A single input waveguide 21 is provided to the input side of the first slab waveguide 19. By contrast, plural output waveguides 22, 22 . . . extend from the output side of the second slab waveguide 20.

It should be noted that the input waveguide 21 corresponds to the "input/output waveguide provided to the outer side of the first slab waveguide" of the claims. Moreover, the output waveguides 22, 22 . . . correspond to the "plurality of input/output waveguides provided to the outer side of the second slab waveguide" in the claims. In other words, the term "outer side" here means the side away from the waveguide array 18.

The number of the output waveguides 22, 22 . . . is normally twice the number of wavelengths which are separated from one another; in other words, it is the number of polarizations which are outputted.

The cross sectional shapes of the waveguides 17 through 22 are not particularly specified; however, they may for example be generally rectangular as shown in FIG. 2.

Further, in order for each of the waveguides 17 through 22 to propagate lights, it is formed from a material whose refractive index is higher than that of the cladding layer 16 in which it is embedded. Yet further, usually each of the waveguides 17 through 22 is made from the same type of material, so that their refractive indices are equal to one another.

The cladding layer 16 and the waveguides 17 through 22 are made from a transparent material. Transparent plastic is desirably utilized for this transparent material.

The light at a single wavelength is made up from a TE polarization and a TM polarization. Since the difference between the refractive indices of this TE polarization and this TM polarization is large in the case of a waveguide which is made from plastic, such a waveguide is particularly suitable for utilization for separating these polarizations. It should be noted that when a difference is present between the refractive index (the effective refractive index) of the TE polarization and the refractive index (the effective refractive index) of the TM polarization, this is expressed as a birefringence characteristic. Moreover, this birefringence characteristic of the waveguide array 18 is taken advantage of in the present invention.

For example, silicone resin, a polyimide series resin like fluorinated polyimide or the like, or a methacryl resin like fluorinated methacrylate or the like, etc. may be used for this plastic. The use of polyimide resin, and in particular of fluorinated polyimide, is desirable, since the difference between the refractive indices of the TE polarization and the TM polarization is large, and furthermore it is easy to adjust this difference between the refractive indices according to the combination of monomers which is utilized, etc.

In concrete terms, as a desirable fluorinated polyimide, it is possible for example to use a copolymer of 6FDA/TFDB as given by the following chemical Equation (1) and 6FDA/ODA as given by the following chemical Equation (2).

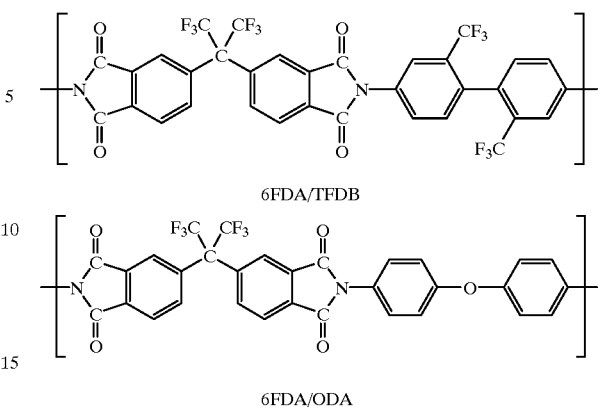

6FDA/TFDB

6FDA/ODA

Figure 3A:
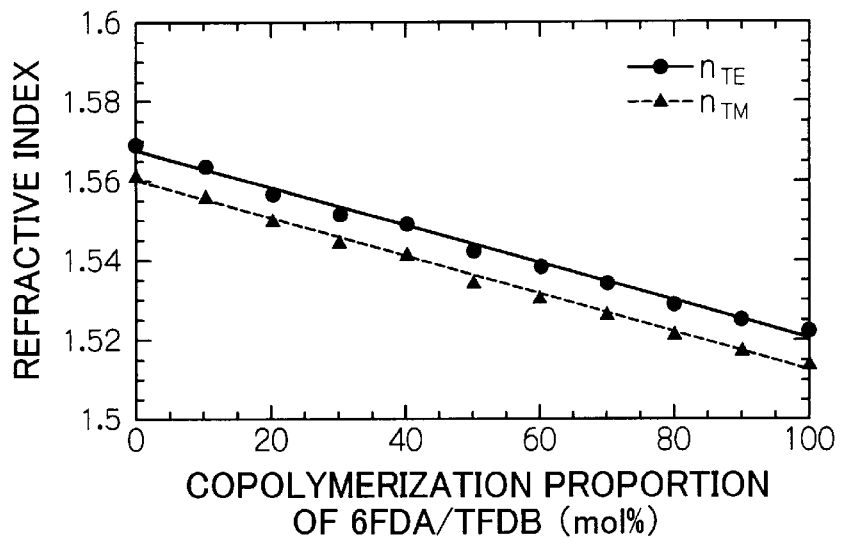
FIGS. 3A and 3B are graphs showing the relationship between the composition of a copolymer which is the material of the waveguide, and the refractive index of said copolymer.

FIG. 3A is a graph showing the relationship between the proportion of 6FDA/TFDB in this copolymer, and the refractive index of said copolymer. $n_{TE}$ in this figure is the refractive index of the TE polarization, while $n_{TM}$ is the refractive index of the TM polarization. As will be clear from this graph, it is possible to vary these refractive indices by varying the composition of the copolymer. Furthermore, it will be understood that a difference is always present between the refractive indices for the TE polarization and the TM polarization, and that this copolymer is a material which exhibits a large birefringence characteristic (anisotropy of refractive index). <REFERENCE 1>

Furthermore, it is also possible to utilize, for example, a copolymer of 6FDA/TFDB as given by the above chemical Equation (1) and PMDA/TFDB as given by the following chemical Equation (3).

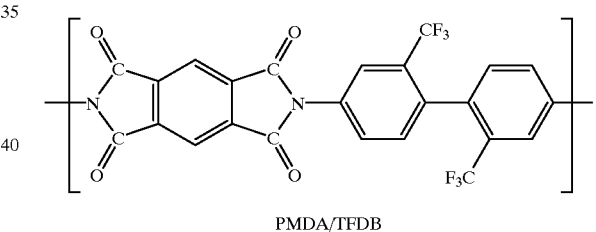

PMDA/TFDB

Figure 3B:
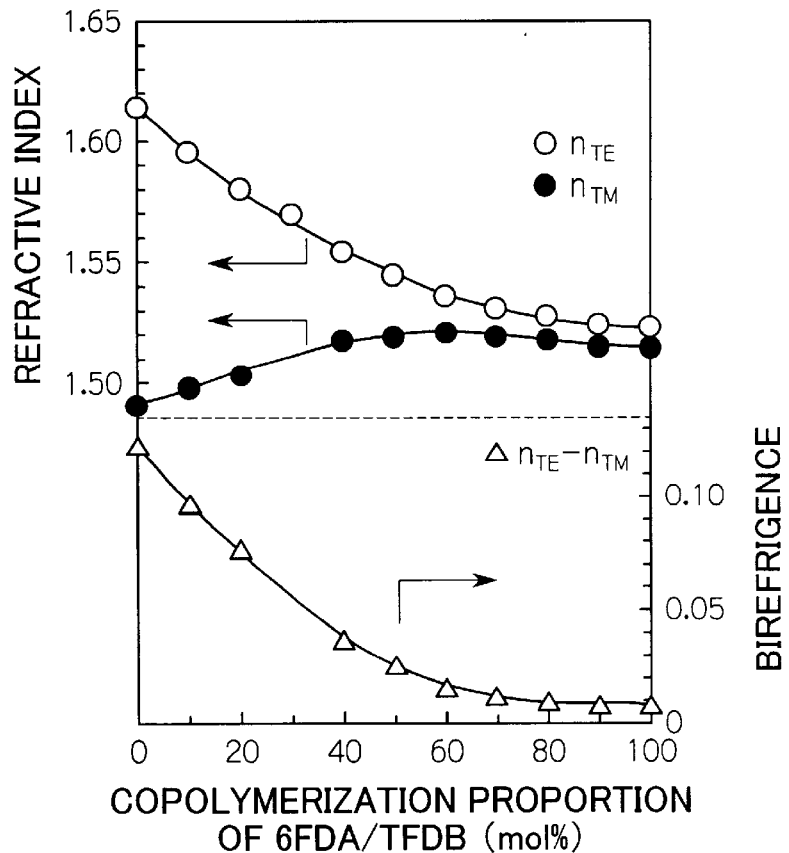

FIG. 3B is a graph showing the relationship between the proportion of 6FDA/TFDB in this copolymer, and the refractive index of said copolymer. TE in this figure is the refractive index of the TE polarization, while TM is the refractive index of the TM polarization. The graph in the upper portion of this figure shows the refractive indices of both of these polarizations, while the graph in its lower portion shows the difference between these refractive indices (the birefringence characteristic). It will be understood that it is possible to vary the difference between these refractive indices by varying the proportion of 6FDA/TFDB in the copolymer. <REFERENCE 2>

<REFERENCE 1: Journal of Lightwave Technology, Vol. 16 No. 16, June 1998, Kobayashi et. al., "Fluorinated Polyimide Waveguides with Low Polarization-Dependent Loss and Their Applications to Thermo-optic Switches"

<REFERENCE 2: Macromolecules, 1994, 27,Tohru Matsuura et. al., "Polyimides Derived from 2,2'-Bis (trifluoromethyl)-4,4'-diaminobiphenyl. 4. Optical Properties of Fluorinated Polyimides for Optoelectronic Components"

If the cladding layer 16 and the waveguides 17 through 22 are to be made from plastic, it is possible, for example, to manufacture this arrayed waveguide grating type optical multiplexer/demultiplexer in the following manner.

That is, first, a lower cladding layer which corresponds in thickness to the amount of cladding which is required under the waveguides 17 through 22 is formed upon the upper surface of the silicon substrate 15 by a spin coating process or the like, and next upon the entire upper surface of this lower cladding layer a waveguide layer is formed which corresponds in thickness to the thickness which is required for the waveguides 17 through 22. And then this waveguide layer is processed by ion etching or the like following the desired pattern for the waveguides 17 through 22, so as to form the waveguides 17 through 22 while exposing the lower cladding layer around them. And next an upper cladding layer is formed over the lower cladding layer and the waveguides 17 through 22 upon it by a further spin coating process or the like, so that this upper cladding layer and the lower cladding layer coalesce into one mass so as to result in the cladding layer 16; and thereby the arrayed waveguide grating type optical multiplexer/demultiplexer is obtained.

Here, in this arrayed waveguide grating type optical multiplexer/demultiplexer, the following equation holds for the effective refractive index of the TE polarization and the effective refractive index of the TM polarization:

$$ns \cdot d \cdot \sin\theta + nc \cdot \Delta L = m \cdot \lambda \quad (1)$$

$$x = Lf \cdot \tan\theta \quad (2)$$

The symbols in this Equation denote the following parameters:

ns~the effective refractive index of the slab waveguides (this effective refractive index differs for the TE polarization and the TM polarization)

d~the distance between the centers of adjacent waveguides included in the waveguide array, at the input side of the slab waveguide of the output side $\Delta L$~the difference in length between adjacent waveguides included in the waveguide array m~the diffraction order $\lambda$~the wavelength Lf~the focal distance of the slab waveguide at the output side $\theta$~the angle of radiation of the light for the slab waveguide of the output side x~the focal position (the output position) of the light at the output end of the slab waveguide at the output side nc~the effective refractive index of the waveguide array (this effective refractive index differs for the TE polarization and the TM polarization)

Figure 4:
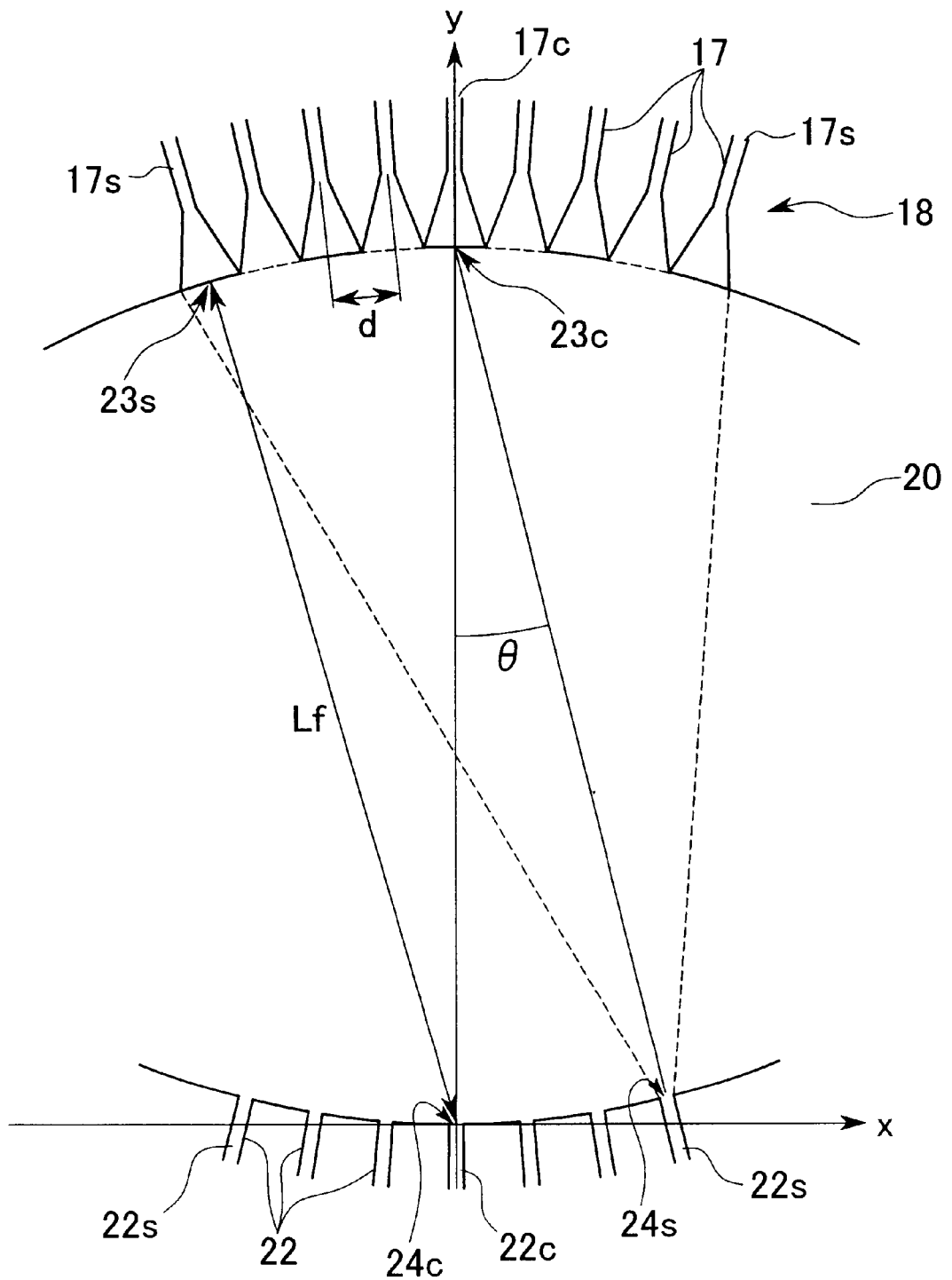
FIG. 4 is an enlarged view of a slab waveguide, showing parameters d, Lf, θ, and x which are used when obtaining an effective refractive index thereof.

In concrete terms, d, Lf, $\theta$ and x are as shown in FIG. 4.

As shown in this figure, Lf is the distance from the center of the output end 23s (at the input end of the slab waveguide 20) of that one, among the waveguides 17, 17 . . . which make up the waveguide array 18, which is positioned at the outermost side of said waveguide array 18, to the center of the input end 24c (at the output end of the slab waveguide 20) of the output waveguide 22c which is in the central position among the plurality of output waveguides 22, 22 . . . which are provided.

And $\theta$ is the angle which is subtended between the line which connects the center of the output end 23c of that waveguide 17c which is in the central position among the waveguides 17, 17 . . . which make up the waveguide array 18 and the center of the input end 24c (at the output end of the slab waveguide 20) of the output waveguide 22c which is in the central position among the plurality of output waveguides 22, 22 . . . which are provided, and the line which connects said output end 23c to the center of the input end 24s of the output waveguide 22s selected discretionarily from the output waveguides 22, 22 . . . .

x is the position upon the x-axis which is perpendicular to the central axis y of this slab waveguide along the direction of light propagation, and passes said center of said input end 24c of said output waveguide 22c which is positioned in the center.

As an example, the values of the various parameters of this embodiment of the arrayed waveguide grating optical multiplexer/demultiplexer may be as shown below. The present invention is not to be considered as being particularly limited by these values; these parameters may be set as appropriate in order to obtain the particular characteristics which are desired in each case.

Moreover, ns(TE) and ns(TM), and nc(TE) and nc(TM) are set to common values for all the wavelengths of the plurality of wavelengths which are transmitted by this optical multiplexer/demultiplexer.

ns(TE): 1.533706 (for all wavelengths)
ns(TM): 1.525438 (for all wavelengths)
d: 11 $\mu$m
$\Delta L$: 71.086 $\mu$m
m: 70
$\lambda$: 1545.322 nm~1557.363 nm
(0.8 nm intervals, with central wavelength $\lambda c$ 1550.918 nm)
Lf: 7500 $\mu$m
nc(TE): 1.53197 (for all wavelengths)
nc(TM): 1.52364 (for all wavelengths)

Figure 5:
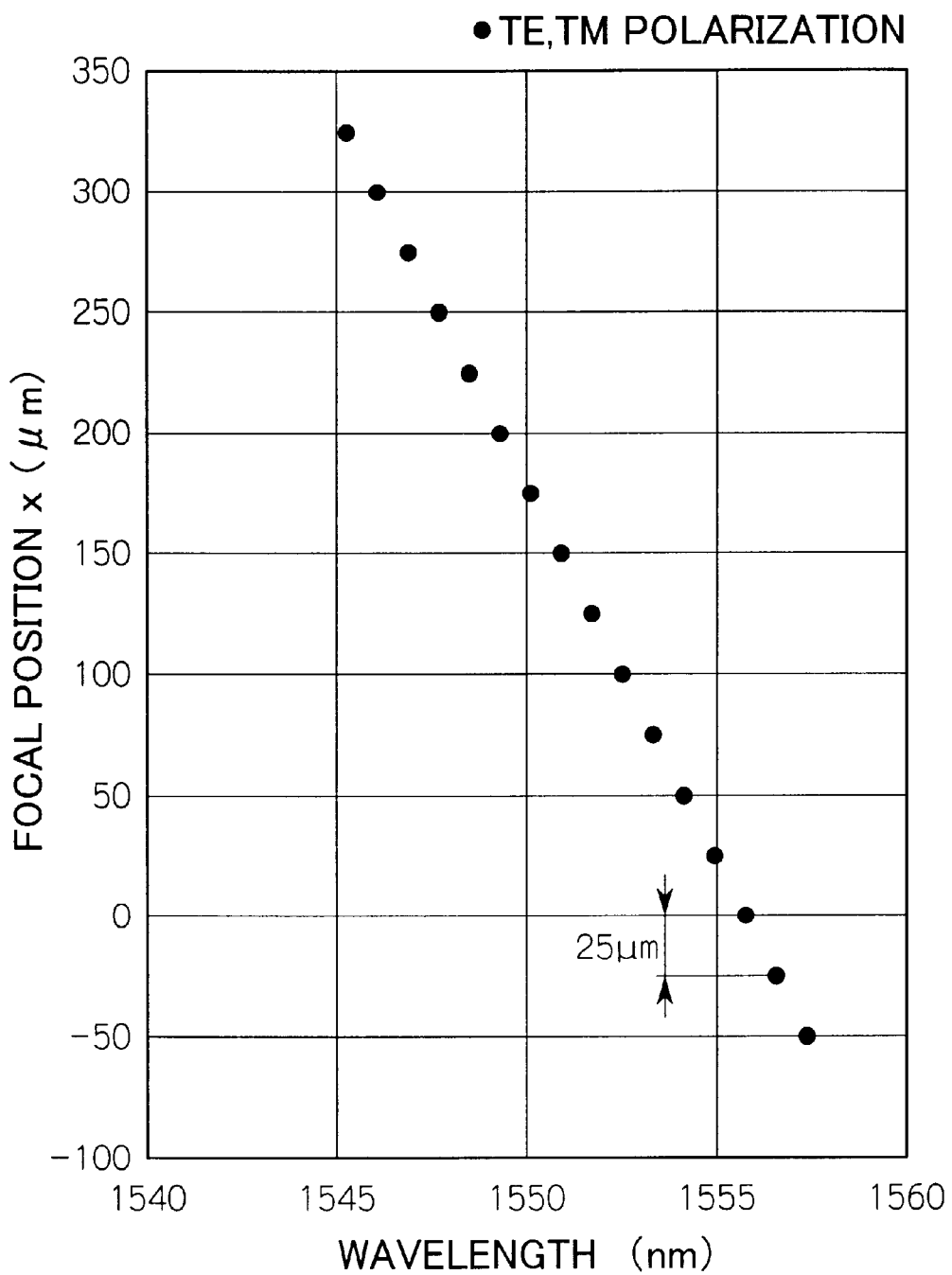
FIG. 5 is a graph showing the relationship between wavelength and focal position (output position), when tentatively nc(TE)=nc(TM)=1.53197 (for all wavelengths).

As described above, here, if tentatively nc(TE)=nc(TM)=1.53197 (for all wavelengths), then the focal positions of the TE and TM polarizations at the output end of the slab waveguide 20 agree for each wavelength. FIG. 5 is a graph showing, for this case, the relationship between wavelength and focal position (output position).

In this example, the wavelength interval is 0.8 nm. Because of this, the interval between the focal positions (the output positions) x of each wavelength is 25 $\mu$m. It is possible to increase this interval by increasing Lf, as will be understood from said Equation (2).

In setting up the optical multiplexer/demultiplexer of the present invention, first the focal positions of the lights of one polarization are fixed, when as shown in FIG. 5 nc(TE)=nc(TM). In other words, the focal positions of the lights of one polarization at each wavelength are distributed at equal intervals, in the positions shown in FIG. 5.

And the focal positions of the lights of the other polarization at each wavelength are set between these focal positions. When this is done, the focal positions of one polarization and the focal positions of the other polarization are arranged to alternate.

Due to this, it is possible to output the multiplexed light at plural different wavelengths which was inputted to the input waveguide 21 from the respective output waveguides for each wavelength and each polarization.

Figure 6:
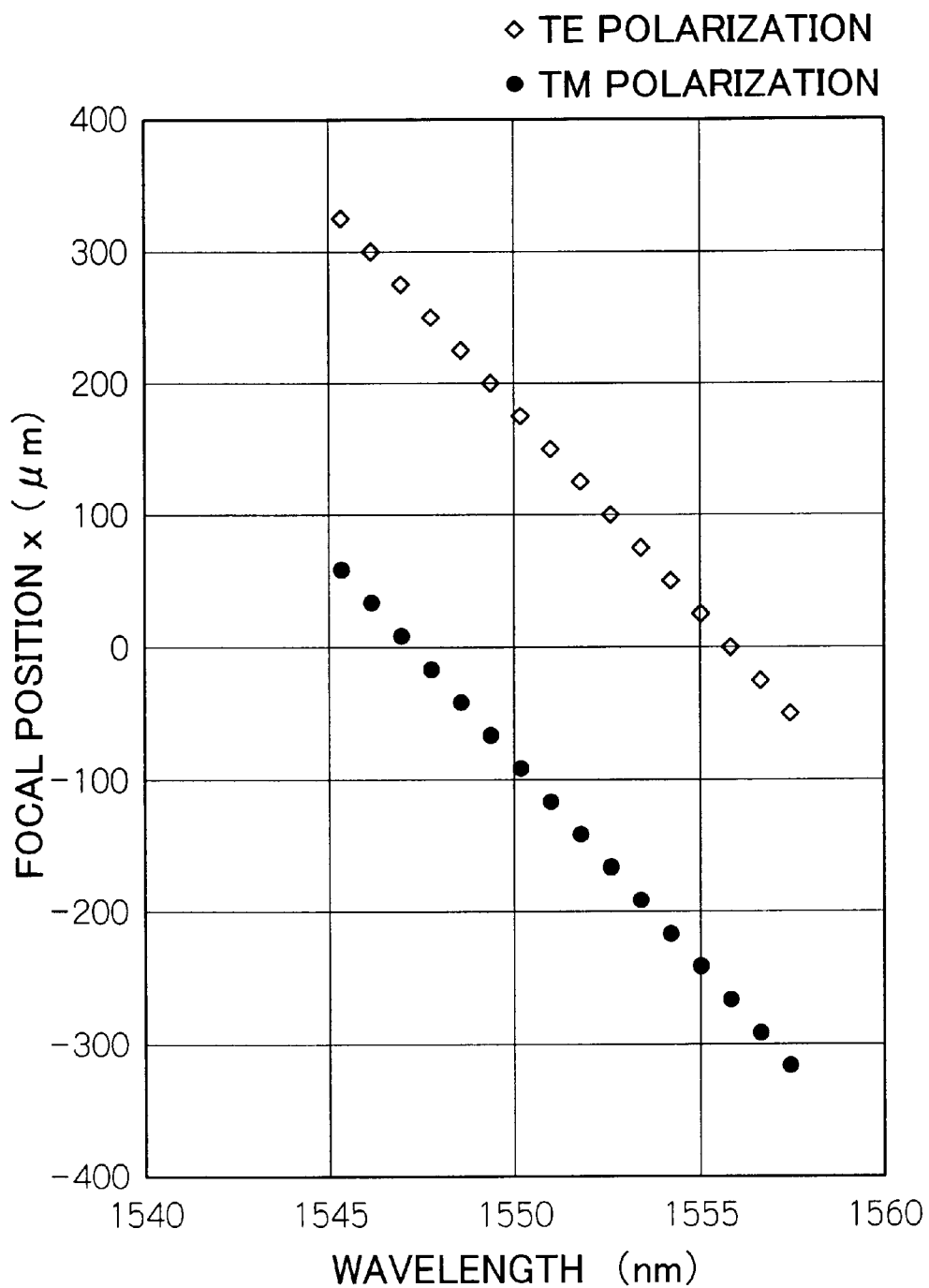
FIG. 6 is a graph showing the relationship between wavelength and focal position (output position), when nc(TE)=1.53197 (for all wavelengths) and nc(TM)=1.52364 (for all wavelengths).

FIG. 6 is a graph showing the relationship between wavelength and focal position (output position), when as described above nc(TE)=1.53197 (for all wavelengths) and nc(TM)=1.52364 (for all wavelengths). The graphs for the TE polarization and the TM polarization are parallel straight lines, and, in the graphs for each polarization, the focal positions for the various wavelengths are spaced apart by intervals of 25 $\mu$m.

And for each pair of polarizations at the same wavelength, the focal position (the output position) of the TM polarization is separated from the focal position (the output position) of the TE polarization by a distance of 265 μm.

If the output waveguides for each TE polarization and the output waveguides for each TM polarization are arranged at these focal positions, then it possible to separate the TM polarizations and the TM polarizations at each wavelength and to output them.

The distance of 265 μm is almost the same as the sum (262.5 μm) of ten channels (25 μm×10=250 μm) of the interval of 25 μm between the focal position for each wavelength and that for the next wavelength, and a half thereof (25 μm/2=12.5 μm)

Accordingly, the interval between the output waveguides for the TE polarizations and the TM polarizations is 12.5 μm. Thus it is possible to obtain the desired characteristics by arranging the output waveguides for the TE polarizations and the TM polarizations alternately at intervals of 12.5 μm at the output end of the slab waveguide of the output side.

In this example, the width of each output waveguide is about 7 μm. Due to this, it is possible to arrange the output waveguides in parallel so that the intervals between their focal positions are spaced apart at 12.5 μm. Furthermore no leakage of light occurs between the output waveguides, since at this time the interval between adjacent output waveguides is 5.5 μm and thus they are sufficiently spaced apart.

Figure 7:
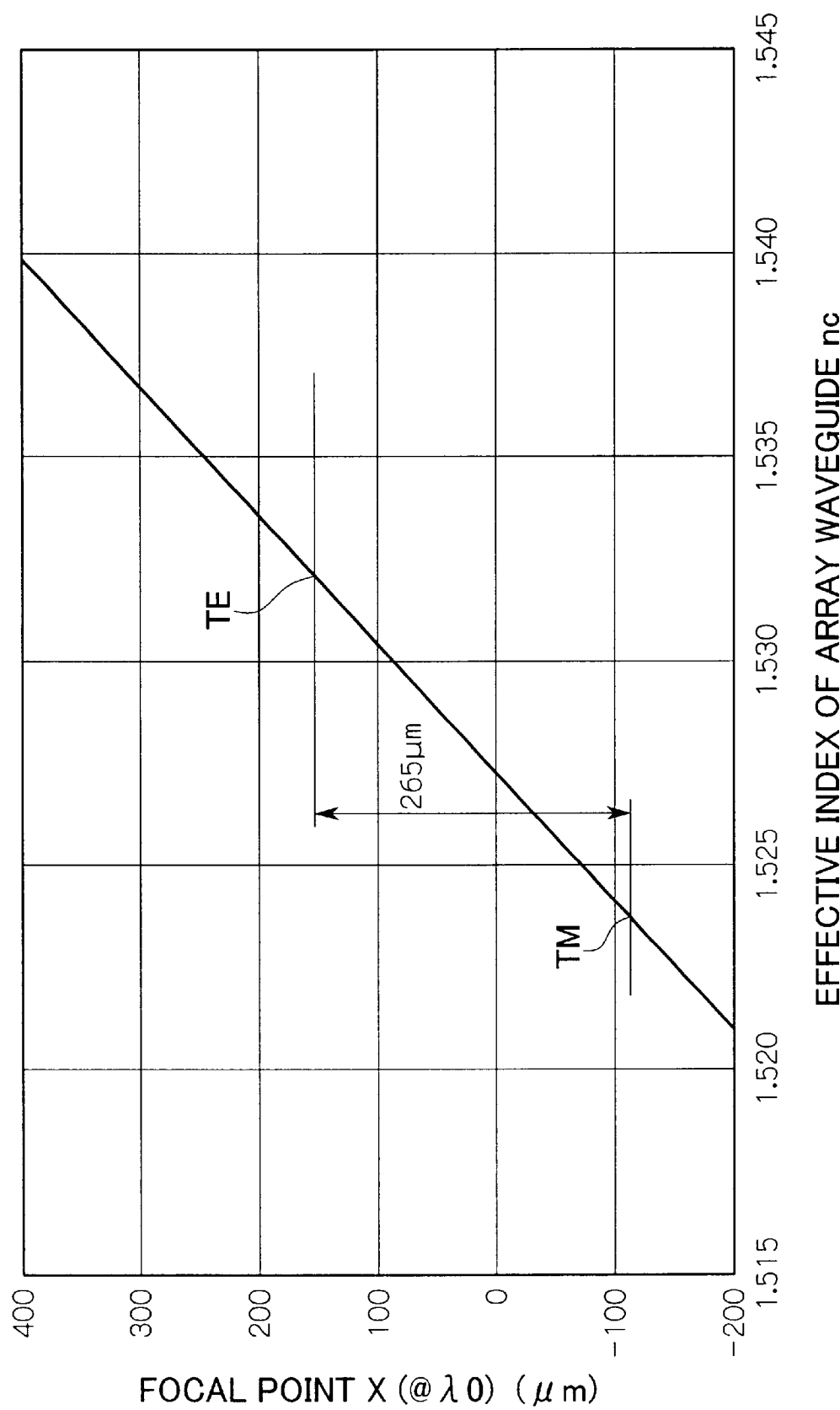
FIG. 7 is a graph showing the results of calculation of the position for arrangement of an output waveguide when the effective refractive indices for TM polarization and TE polarization of a waveguide array are changed.

For reference, FIG. 7 shows the results of calculation of the focal position (the output position) x which corresponds to the light at the central wavelength, i.e. of calculation of the position for arrangement of the output waveguide, as the effective refractive indices for TM polarization and TE polarization of the waveguide array are varied.

It will be understood that it is possible to adjust the focal position (the output position) by selecting the effective refractive index of the waveguide array for both polarizations.

Furthermore no problem occurs due to light of which the diffraction orders are different, since the FSR (Free Spectral Range) for this embodiment is 22.1 nm, which is wider than the bandwidth of λ (1557.363 to 1545.322, i.e. about 12 nm).

Moreover, a simulation has been performed using a beam propagation method.

Figure 8:
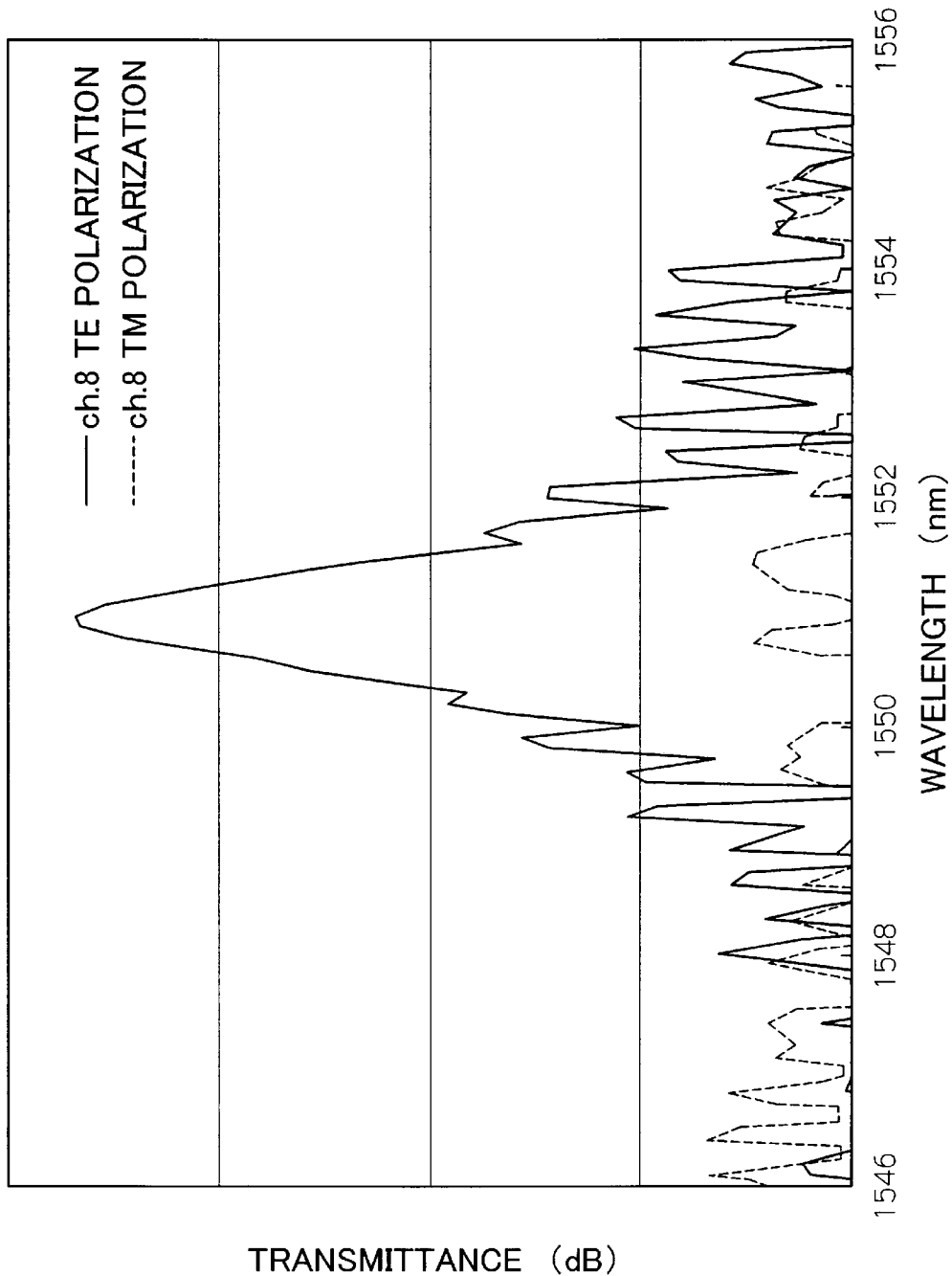
FIG. 8 is a graph showing the light transmission characteristic for a channel no. #8.
Figure 9:
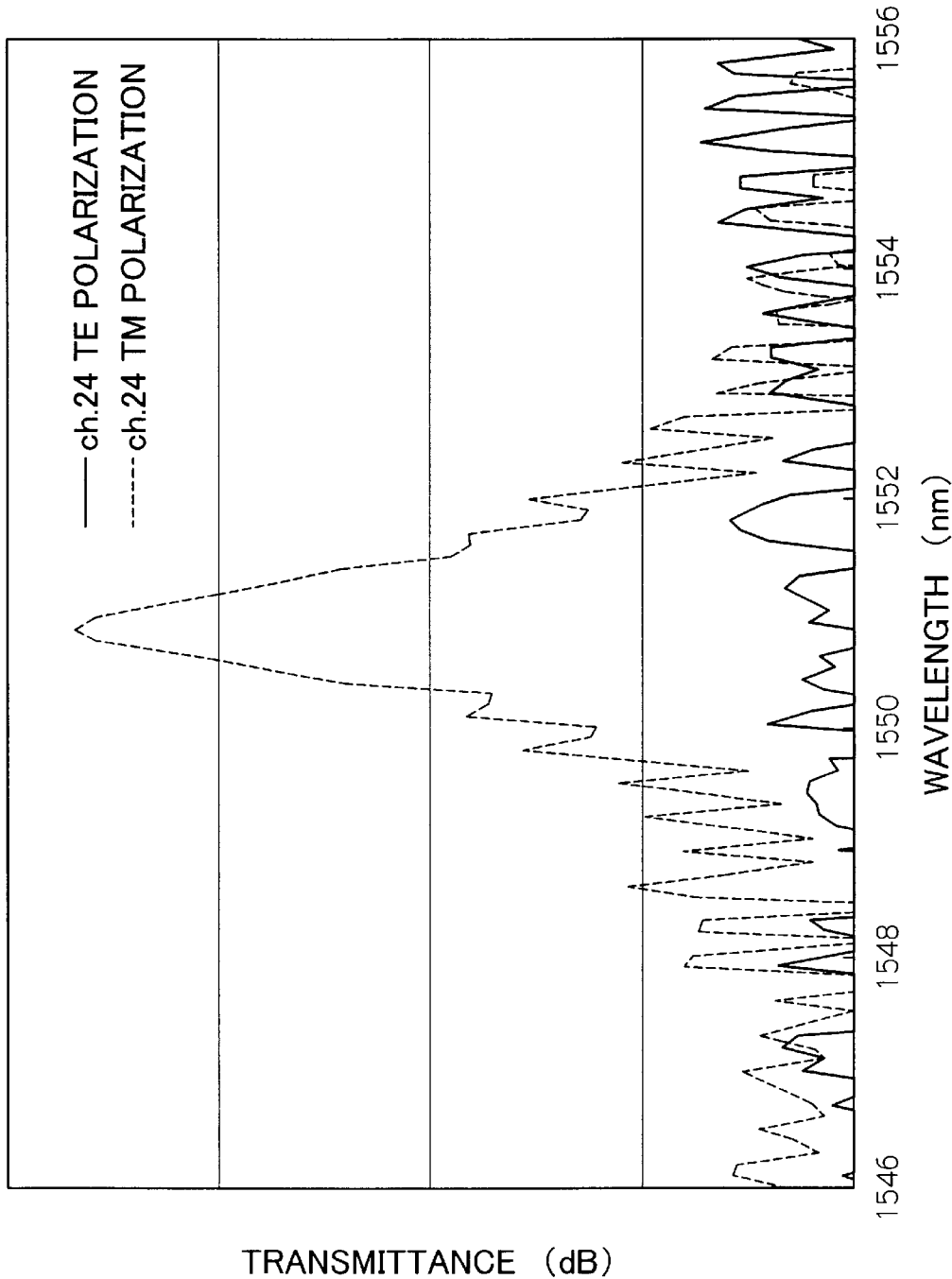
FIG. 9 is a graph showing the light transmission characteristic for a channel no #24.

If, the channels are termed channel #1 (ch#1), channel #2 (ch. #2), . . . in order from the outermost output waveguide, as shown in FIGS. 1 and 4, then the light transmission characteristic of ch. #8 is shown in FIG. 8. It will be clear that only the TE polarization at a central wavelength of 1551 nm is selectively outputted. By contrast, the light transmission characteristic of ch. #24 is shown in FIG. 9. It will be clear that only the TM polarization at a central wavelength of 1551 nm is selectively outputted. Accordingly, it is possible to separate the TE polarization and the TM polarization which make up the light at a central wavelength of 1551 nm, and to output them separately.

Figure 10:
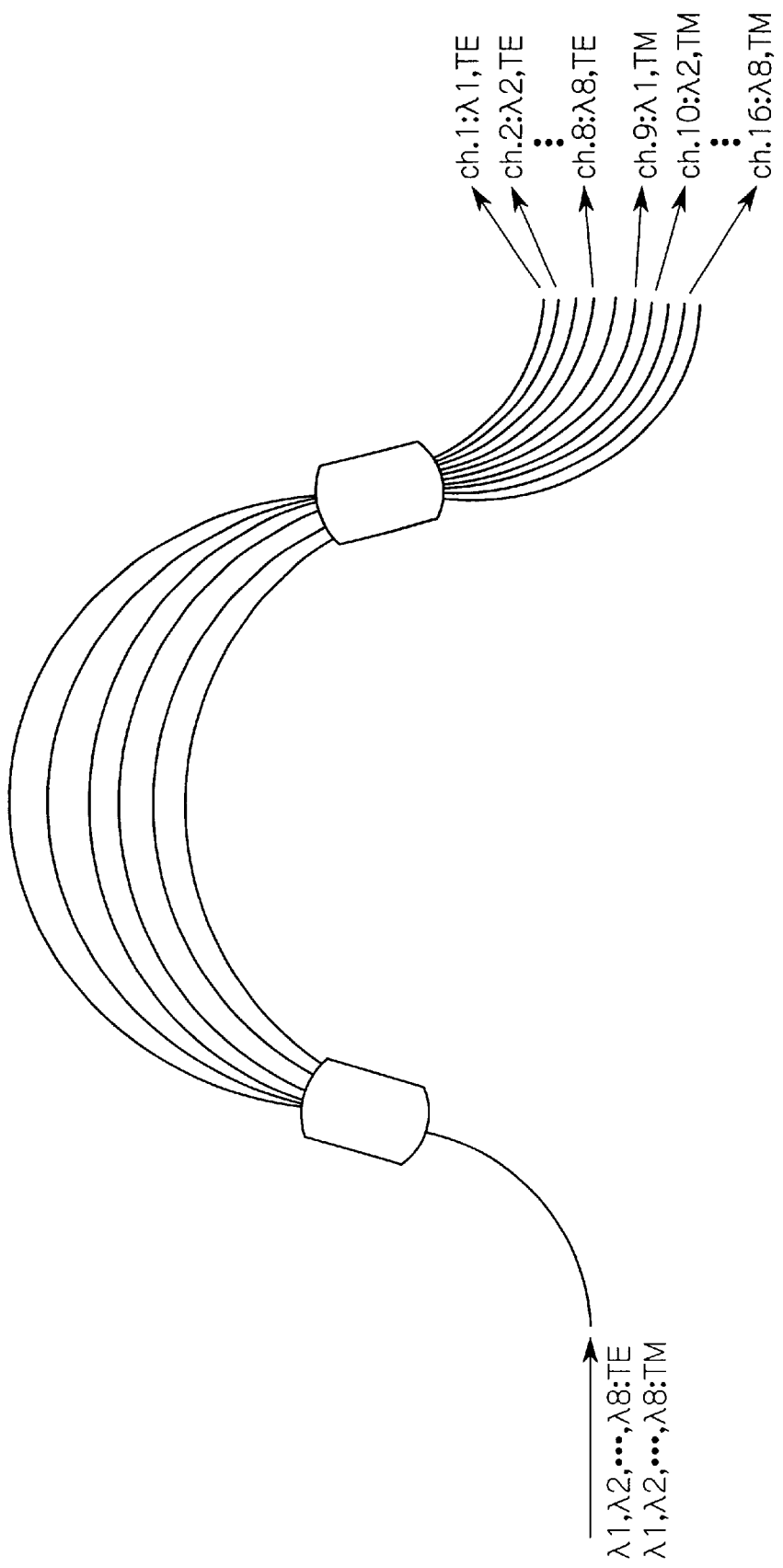
FIG. 10 is a general constructional view showing an actual optical multiplexer/demultiplexer which uses fluorinated polyimide.

Furthermore, using the above described parameter settings as an example, an arrayed waveguide grating type optical multiplexer/demultiplexer has been manufactured which outputs the TE polarizations and the TM polarizations of lights at each of eight wavelengths λ1, λ2, . . . λ8, as shown in FIG. 10.

It should be noted that in this case both the cladding layer and the waveguides were manufactured using fluorinated polyimide.

Figure 11:
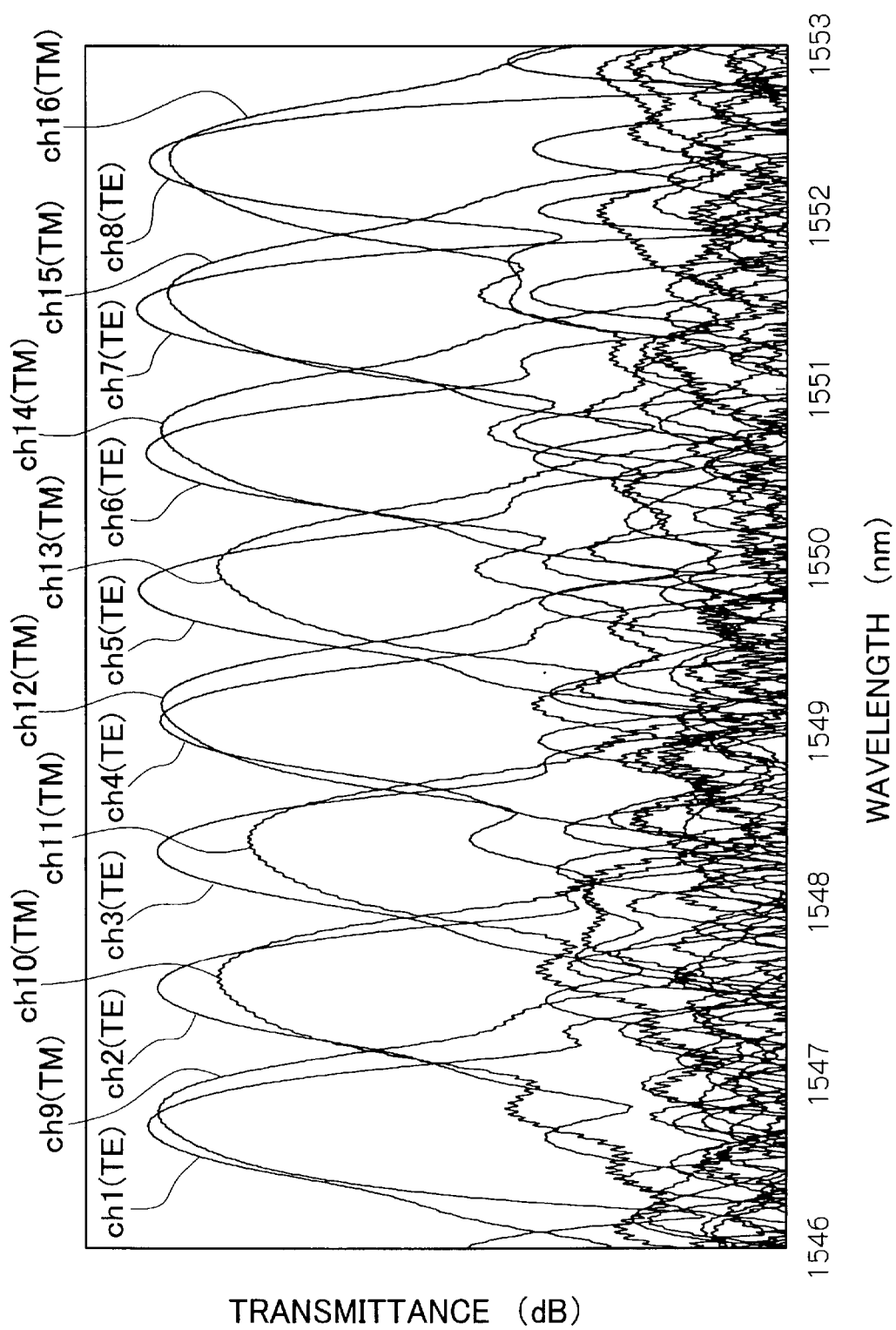
FIG. 11 is a graph showing, for the arrayed waveguide grating type optical multiplexer/demultiplexer shown in FIG. 10, the wavelength—tansmittance relationship of multiplexed light of wavelengths λ1 through λ8 which is inputted to an input waveguide and which is actually outputted from channels #1 through #16.

FIG. 11 is a graph showing, for this arrayed waveguide grating type optical multiplexer/demultiplexer, the wavelength—tansmittance relationship of multiplexed light of wavelengths λ1 through λ8 which was inputted to the input waveguide and was actually outputted from channels #1 through #16.

It will be understood that the light outputted from each channel has been separated by wavelength and by polarization as well.

Figure 12:
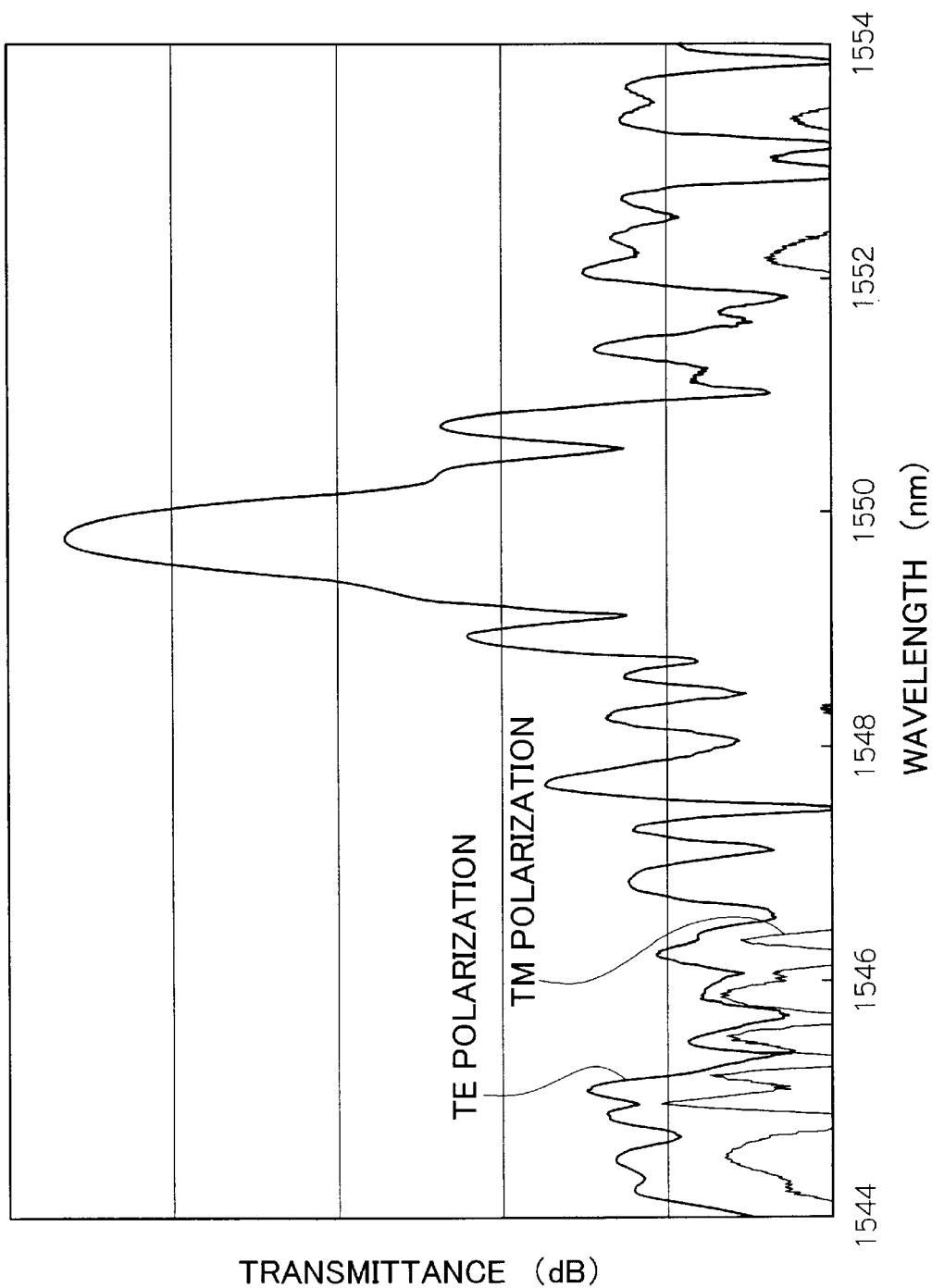
FIG. 12 is a graph showing, for the arrayed waveguide grating type optical multiplexer/demultiplexer shown in FIG. 10, the wavelength—tansmittance characteristic of the light which is outputted from channel #5.
Figure 13:
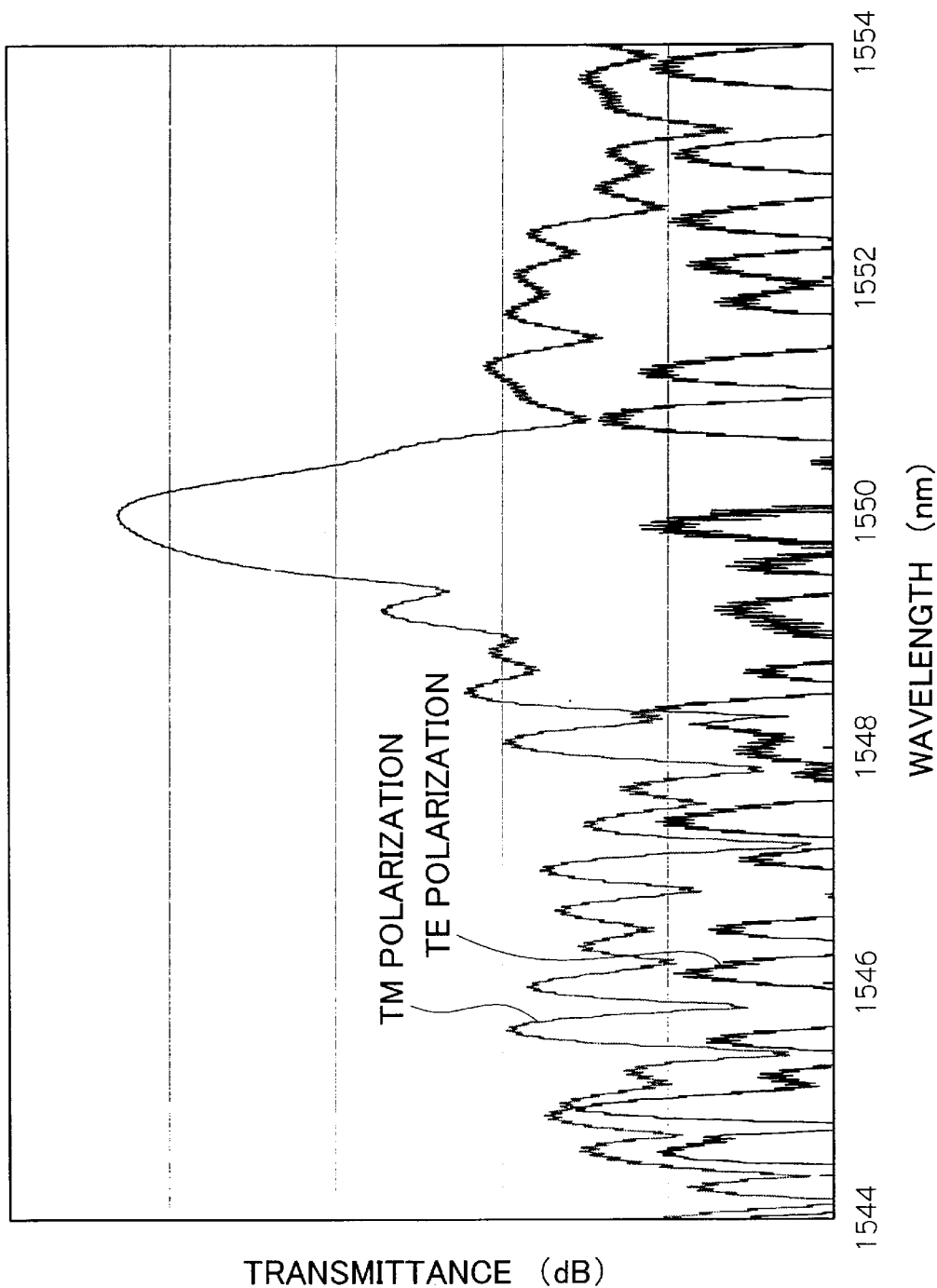
FIG. 13 is a graph showing, for the arrayed waveguide grating type optical multiplexer/demultiplexer shown in FIG. 10, the wavelength—tansmittance characteristic of the light which is outputted from channel #13.
Figure 14:
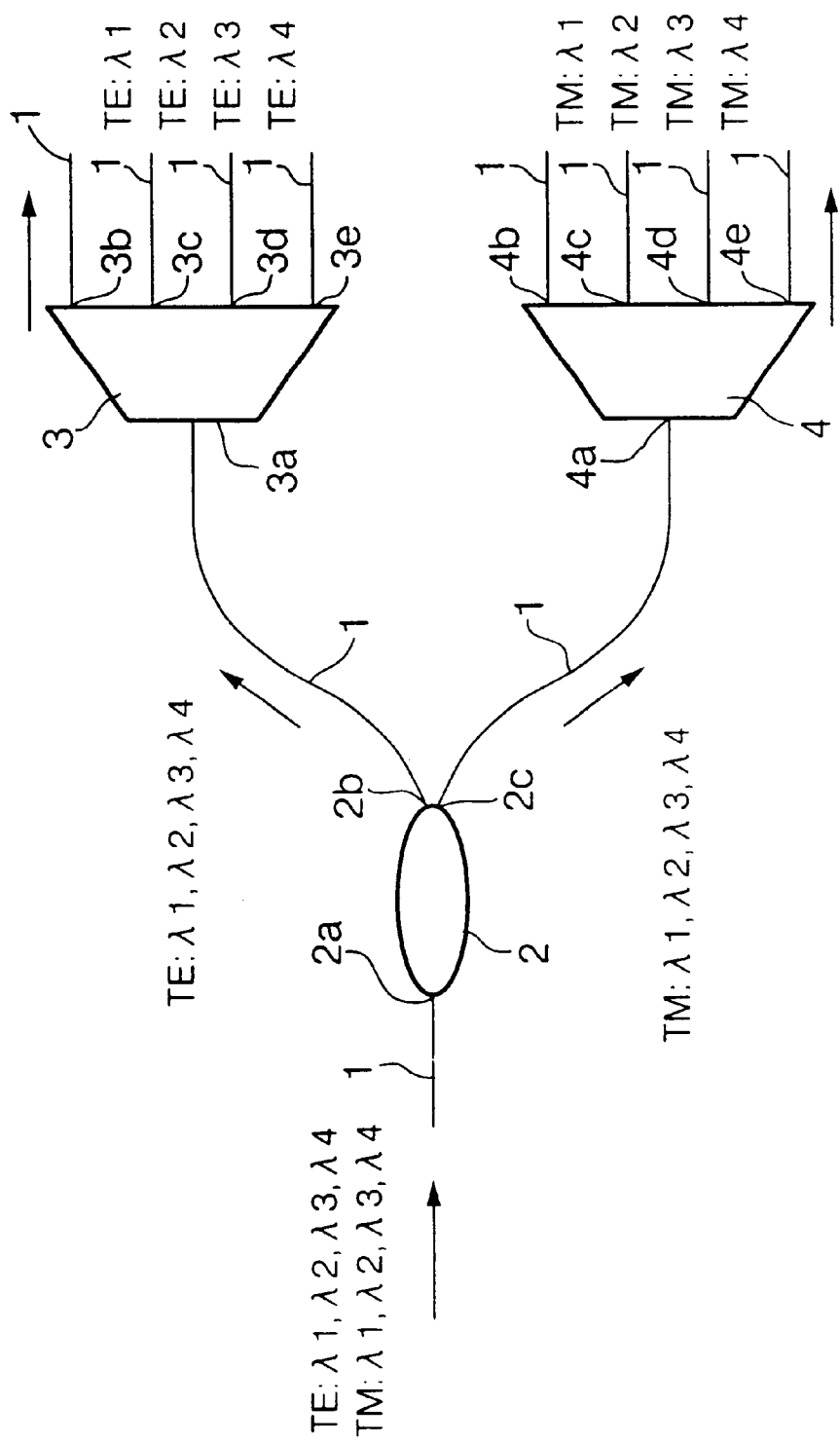
FIG. 14 is a block diagram showing an example of a prior art polarization/wavelength multiplex transmission circuit.
Figure 15:
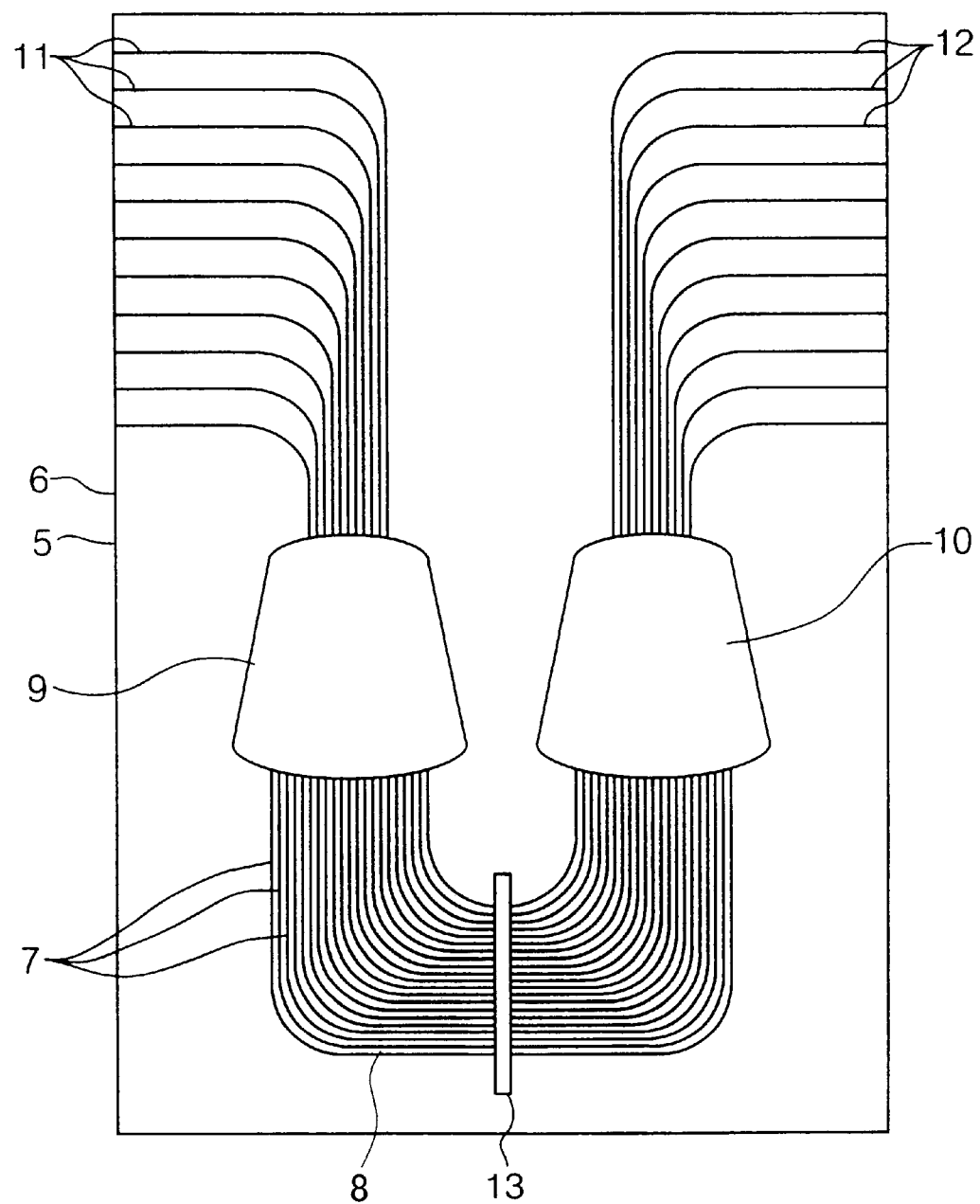
FIG. 15 is a plan view showing an example of an arrayed waveguide grating type optical multiplexer/demultiplexer.

FIGS. 12 and 13 are graphs showing, for this arrayed waveguide grating type optical multiplexer/demultiplexer, the wavelength—tansmittance characteristics of the lights which are outputted from channel #5, and from channel #13, respectively.

It will be clear that the light at a central wavelength of 1550 nm is separated into a TE polarization and a TM polarization, and is output from the channels #5 and #13 respectively.

Accordingly, for this actual arrayed waveguide grating type optical multiplexer/demultiplexer which was manufactured using fluorinated polyimide, it is possible to verify that the characteristic has been obtained of separation of the multiplexed light of plural wavelengths both by wavelength and by polarization.

As described above, it is possible, with the arrayed waveguide grating type optical multiplexer/demultiplexer of the present invention, to output light of each wavelength and each polarization by forming the waveguide array from a material for which the difference between the effective refractive indices for the two polarizations is large.

Although it is not possible particularly to restrict the effective refractive index of each polarization, since it also changes due to the wavelength band which is transmitted etc., in the operating wavelength band for this optical multiplexer/demultiplexer, it is desirable to be able to make the difference between the effective refractive index of the waveguide array for TM polarization and the effective refractive index of the waveguide array for TE polarization greater than or equal to about 0.0004, and it is more desirable to be able to make said difference greater than or equal to about 0.0005. As a result, when ΔL, m and d are set to the values shown in the above described example of parameter setting, it is possible to set the interval between the output waveguides to greater than or equal to 12.5 μm, and it is possible to obtain an optical multiplexer/demultiplexer which is actually capable of simultaneously performing separation by wavelength and by polarization.

It should be noted that, although for the sake of convenience the explanation herein has been made in terms of the operation, as described above, of separation of light by polarization and by wavelength, the optical multiplexer/demultiplexer of the present invention has the characteristic of reversibility: it is also possible to perform the reverse operation of combining light with this optical multiplexer/demultiplexer, in the opposite manner to that described above.

In other words if, in the manner opposite to that shown by the arrows in FIG. 1, said plurality of output waveguides 22, 22 . . . are utilized as input waveguides, and plural lights are inputted to them which differ either in polarization or wavelength or both, then it is possible to combine this plurality of lights of different polarizations and/or wavelengths, and to output the resultant light from the input waveguide 21, which is now utilized as an output waveguide.

What is claimed is:

1. An arrayed waveguide grating type optical multiplexer/demultiplexer in which a waveguide is provided in a cladding layer, wherein said waveguide comprises:

a waveguide array in which plural waveguides of different lengths are arranged in parallel;

a first slab waveguide and a second slab waveguide which are provided at opposite ends of said waveguide array;

an input/output waveguide which is provided on the outer side of said first slab waveguide; and plural input/output waveguides which are provided on the outer side of said second slab waveguide, wherein, when multiplexed light consisting of lights of plural different wavelengths is inputted into said input/output waveguide which is provided on the outer side of said first slab waveguide, the lights which have been separated by wavelength and by polarization are outputted from said plurality of input/output waveguides which are provided on the outer side of said second slab waveguide, and said cladding layer and said waveguides which are provided within it are formed from plastic.

2. An optical multiplexer/demultiplexer according to claim 1, wherein said plastic is fluorinated polyimide.

3. An arrayed waveguide grating type optical multiplexer/demultiplexer in which a waveguide is provided in a cladding layer, wherein said waveguide comprises:

a waveguide array in which plural waveguides of different lengths are arranged in parallel;

a first slab waveguide and a second slab waveguide which are provided at opposite ends of said waveguide array;

an input/output waveguide which is provided on the outer side of said first slab waveguide; and plural input/output waveguides which are provided on the outer side of said second slab waveguide, wherein, when multiplexed light consisting of lights of plural different wavelengths is inputted into said input/output waveguide which is provided on the outer side of said first stab waveguide, the lights which have been separated by wavelength and by polarization are outputted from said plurality of input/output waveguides which are provided on the outer side of said second slab waveguide, and said cladding layer is provided upon a substrate.

4. An optical multiplexer/demultiplexer according to claim 1, wherein, for each wavelength, at the end portion of said second slab waveguide on the side of said plurality of input/output waveguides, the focal positions of one polarization and the other polarization are different.

5. An optical multiplexer/demultiplexer according to claim 1, wherein a birefringence characteristic of said waveguide array is utilized.

6. An optical multiplexer/demultiplexer according to claim 1, wherein said cladding layer is provided upon a substrate.

7. An optical multiplexer/demultiplexer according to claim 1, wherein, in the operating wavelength band for said optical multiplexer/demultiplexer, the difference between the effective refractive index of one of the polarizations of said waveguide array and the effective refractive index of the other of the polarizations of said waveguide array is greater than or equal to 0.0004.

8. An optical multiplexer/demultiplexer according to claim 1, wherein, when lights, of which either the polarization or the wavelength or both are different, are inputted to each of said plurality of input/output waveguides, then these lights are combined, and are outputted from said input/output waveguide which is provided to said first slab waveguide.

9. An optical multiplexer/demultiplexer according to claim 3, wherein, for each wavelength, at the end portion of said second slab waveguide on the side of said plurality of input/output waveguides, the focal positions of one polarization and the other polarization are different.

10. An optical multiplexer/demultiplexer according to claim 3, wherein a birefringence characteristic of said waveguide array is utilized.

11. An optical multiplexer/demultiplexer according to claim 3, wherein said cladding layer and said waveguides which are provided within it are formed from plastic.

12. An optical multiplexer/demultiplexer according to claim 11, wherein said plastic is fluorinated polyimide.

13. An optical multiplexer/demultiplexer according to claim 3, wherein, in the operating wavelength band for said optical multiplexer/demultiplexer, the difference between the effective refractive index of one of the polarizations of said waveguide array and the effective refractive index of the other of the polarizations of said waveguide array is greater than or equal to 0.0004.

14. An optical multiplexer/demultiplexer according to claim 3, wherein, when lights, of which either the polarization or the wavelength or both are different, are inputted to each of said plurality of input/output waveguides, then these lights are combined, and are outputted from said input/output waveguide which is provided to said first slab waveguide.

* * * * *